(12) United States Patent
Lebeau et al.

(10) Patent No.: US 11,096,334 B2
(45) Date of Patent: Aug. 24, 2021

(54) ROUND BALER INCLUDING ULTRASONIC FILM SENSOR

(71) Applicant: DEERE & COMPANY, Moline, IL (US)

(72) Inventors: Jonathan Lebeau, Dijon (FR); Pascal Gresset, Auxon Dessous (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 161 days.

(21) Appl. No.: 16/504,569

(22) Filed: Jul. 8, 2019

(65) Prior Publication Data

US 2020/0008358 A1 Jan. 9, 2020

(30) Foreign Application Priority Data

Jul. 6, 2018 (DE) .......................... 102018211228.2
Apr. 11, 2019 (EP) ..................................... 19168593

(51) Int. Cl.
*A01F 15/07* (2006.01)
*B65B 11/58* (2006.01)
(Continued)

(52) U.S. Cl.
CPC .......... *A01F 15/0715* (2013.01); *B65B 11/58* (2013.01); *B65B 27/125* (2013.01);
(Continued)

(58) Field of Classification Search
CPC ....... B65B 11/025; B65B 11/04; B65B 11/58; B65B 41/16; B65B 57/12; A01F 15/071;
(Continued)

(56) References Cited

U.S. PATENT DOCUMENTS 6,966,162 B2 * 11/2005 Viaud et al. ........ A01F 15/0715
53/64
7,437,866 B2 * 10/2008 Smith et al. ........ A01F 15/0833
56/341
(Continued)

FOREIGN PATENT DOCUMENTS

DE          60225537 T2     4/2009
DE      102015008745 A1 *  1/2017  ......... A01F 15/0715
(Continued)

OTHER PUBLICATIONS

German Search Report issued in counterpart application No. 102018211228.2 dated Mar. 11, 2019. (10 pages).
(Continued)

*Primary Examiner* — Stephen F. Gerrity

(57) ABSTRACT

A round baler includes a bale chamber in which a round bale can be produced, and a wrapping device with which a completely pressed round bale can be wrapped with a first film in the bale chamber, and a feed device for introducing the first film into the bale chamber. The round baler also includes a feed point at which the first film can be fed to the bale chamber, and an ultrasonic sensor which is arranged at the bale chamber. The ultrasonic sensor is arranged at the bale chamber in such a way that with the ultrasonic sensor it is possible to determine whether the film is present on a surface of the round bale.

12 Claims, 6 Drawing Sheets

(51) Int. Cl.
*B65B 41/16* (2006.01)
*B65B 57/12* (2006.01)
*B65B 27/12* (2006.01)
*B65B 41/12* (2006.01)
*B65B 57/04* (2006.01)

(52) U.S. Cl.
CPC .............. *B65B 41/12* (2013.01); *B65B 41/16* (2013.01); *B65B 57/04* (2013.01); *B65B 57/12* (2013.01); *A01F 2015/076* (2013.01)

(58) Field of Classification Search
CPC .......... A01F 15/0715; A01F 2015/0735; A01F 2015/076
USPC ........... 53/64, 176, 587, 588, 203, 210, 211, 53/389.4
See application file for complete search history.

(56) References Cited

U.S. PATENT DOCUMENTS

| | | | |
|---|---|---|---|
| 8,141,480 B2 * | 3/2012 | Smith | ................. A01F 15/0715 100/88 |
| 8,434,289 B2 | 5/2013 | Smith et al. | |
| 8,573,480 B2 | 11/2013 | Ma et al. | |
| 10,289,696 B2 * | 5/2019 | Derscheid | ............... A01F 15/07 |
| 2017/0006779 A1 | 1/2017 | Keune | |
| 2017/0057680 A1 * | 3/2017 | Schlichting | ......... A01F 15/0715 |
| 2020/0008357 A1 * | 1/2020 | Biziorek et al. | ........ B65B 57/12 |

FOREIGN PATENT DOCUMENTS

| | | | | |
|---|---|---|---|---|
| EP | 1461995 | A2 | 9/2004 | |
| EP | 1464216 | A1 * | 10/2004 | ......... A01F 15/0715 |
| EP | 1464216 | A1 | 10/2004 | |
| EP | 2647281 | A2 * | 10/2013 | ......... A01F 15/0715 |
| WO | 02076184 | A1 | 10/2002 | |

OTHER PUBLICATIONS

European Search Report issued in counterpart application No. 19168593.2 dated Oct. 16, 2019. (7 pages).

* cited by examiner

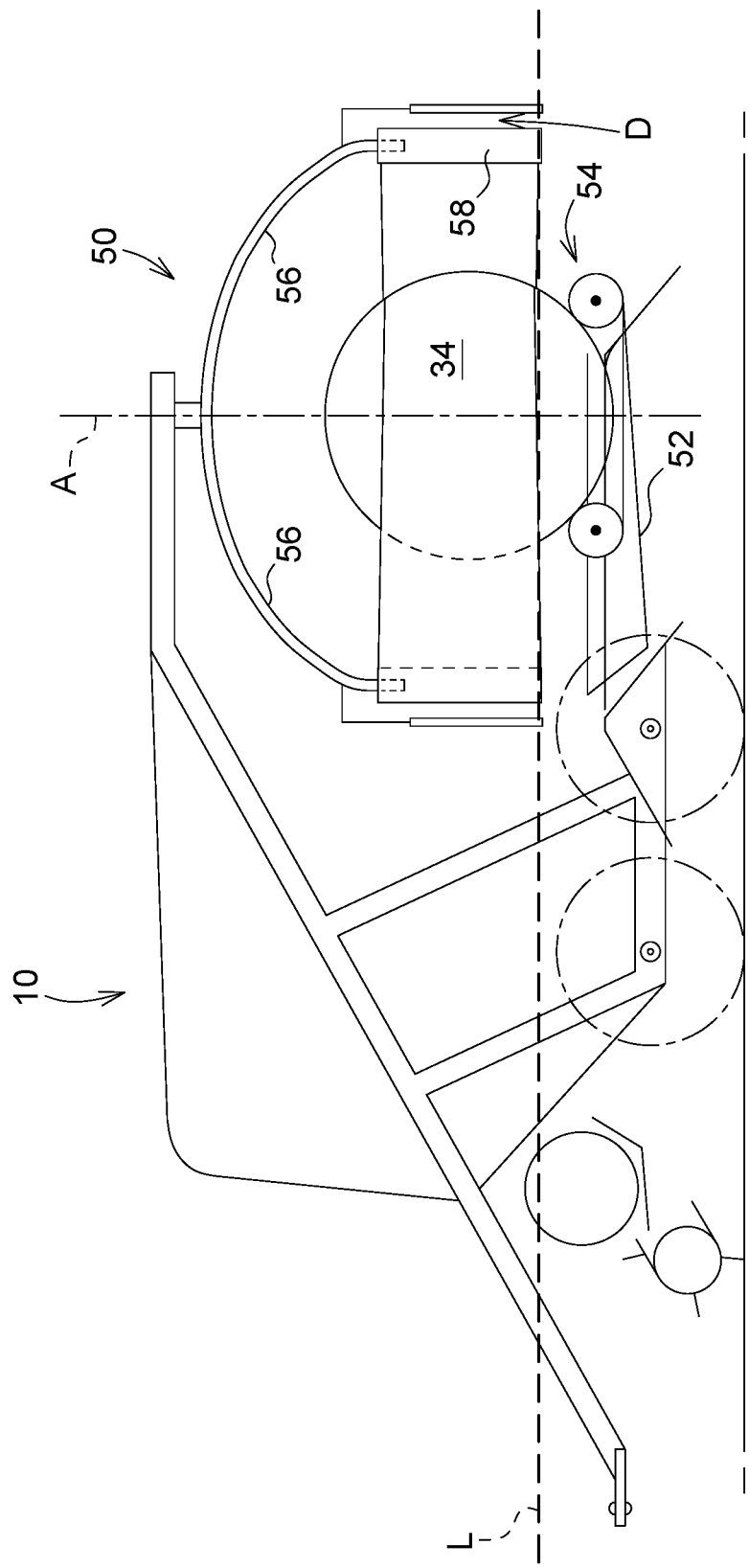

ROUND BALER INCLUDING ULTRASONIC FILM SENSOR

CROSS-REFERENCE TO RELATED APPLICATIONS

This application claims the benefit of and priority to European Patent Application No. 19168593.2, filed on Apr. 11, 2019, which claims the benefit of and priority to German Patent Application No. 102018211228.2, filed on Jul. 6, 2018, the disclosures of which are hereby incorporated by reference.

TECHNICAL FIELD

The disclosure generally relates to a round baler, and to a method of detecting a first film on a surface of a round bale.

BACKGROUND

Round balers are known. A round bale is shaped in a bale chamber of the round baler during a pressing process. For this purpose, harvested material, for example straw, grass or cereal which is lying on the ground is conveyed into the bale chamber by a pick device and shaped into the round bale by arranged pressing means. The round baler can comprise a housing in which the bale chamber can be located. The housing can comprise a housing part and/or a discharge flap. The housing can also be arranged on a chassis. The bale chamber can comprise one or more pressing means which can be distributed, for example, on or at the housing part and/or the discharge flap and/or bound the bale chamber around its periphery. The pressing means can generate a rotation-generating or rotation-maintaining engagement effect on the round bale which is located in the bale chamber. Furthermore, the bale chamber can be embodied as a bale chamber which is invariable in size or is fixed, in particular with cylindrically arranged pressing means, for example pressing rollers or pressing drums, or else as a bale chamber which is variable in size or variable, with variable pressing means, for example pressing belts or pressing chains or pressing straps. In the case of a fixed bale chamber, the pressing means can be arranged as a multiplicity of pressing rollers which run parallel to one another. The rotational axes of the pressing rollers can lie on a circular arc when the discharge flap is closed, and at least one of the pressing rollers can be driven. The arrangement of the pressing rollers in the bale chamber can correspond to a cylindrical shape, with the result that the pressing rollers are arranged cylindrically around the round bale and form a cylindrical circumferential face.

In addition, it is known to equip round balers with a wrapping device. After the end of a pressing process, that is to say when the round bale has reached the necessary size, the completely pressed round bale is wrapped with a wrapping material, for example net or yarn, with the wrapping device, and is subsequently discharged in wrapped form. In a wrapping process which follows the pressing process, the wrapping device guides the wrapping material, in particular a first film, in the direction of the shaped round bale into the bale chamber and said wrapping material is pulled along by the outside of the round bale. The round baler can comprise a feed device for introducing the wrapping material into the bale chamber and/or a feed point at which the wrapping material can be fed to the bale chamber, and/or the wrapping device. However, the wrapping device can also comprise the feed device and feed point. The feed device can extend here at least partially along the width of the bale chamber. The feed device, for example, an advancing element or an advancing drum, can pull off, in a feed movement, the wrapping material from a supply, for example the supply roller, and introduce it into the bale chamber at the feed point. A certain prestressing force can be applied to the supply by a contact pressure element, so that the wrapping material can be wrapped around the round bale with corresponding tensile force. The supply can be mounted on the chassis or on or in a supply chamber designed as a housing. The wrapping device, in particular the feed device, can also comprise a pressure application element or a guide element which positions and/or presses the first film around the round bale at the start of the wrapping process, with the result that the first film can be carried along by said round bale and in this way is pulled off the supply. The wrapping material is guided around the round bale by the rotating round bale, and subsequently disconnected from the round bale by a cutting device before the round bale is discharged or placed on the ground. Moreover, the wrapping device, in particular the feed device, can also have further transporting elements or conveyor elements for carrying the wrapping material.

EP 1 461 995 A2 discloses a round baler having a wrapping device for wrapping a round bale. The wrapping device has a sensor which determines whether wrapping material is present on a surface of the round bale. The round baler disclosed in EP 1 461 995 A2, may not detect the wrapping material on a surface of the round bale and does not break off the wrapping process in good time, with the result that backing up of the wrapping material occurs. In this context, the wrapping material can be wound, for example, around the pressing means or the feed device. Moreover, the sensors and methods which are used in the known round balers are not sufficient to detect satisfactory wrapping on the surface of the round bale.

SUMMARY

According to the disclosure, a round baler having a bale chamber in which a round bale can be produced is proposed. The round baler also comprises a wrapping device with which a completely pressed round bale can be wrapped with a first film in the bale chamber. The round baler further has a feed device for introducing the first film into the bale chamber and a feed point at which the first film can be fed to the bale chamber. Furthermore, the round baler comprises an ultrasonic sensor which is arranged at the bale chamber in such a way that with the ultrasonic sensor it is possible to determine, or the ultrasonic sensor determines, whether the first film is present on a surface of the round bale. Specifically, the round baler comprises an ultrasonic sensor which is arranged at the bale chamber, in such a way that the surface of the round bale can be scanned with the ultrasonic sensor, wherein with the ultrasonic sensor it is possible to determine whether the first film is present on the surface of the round bale.

The first film can be a plastic film, a film made of plastic and/or a film which comprises plastic or is coated with plastic. The film can also be a multi-layer composite film made of a combination of different plastics. The mechanical load-bearing capacity can also be increased by reinforcing with glass fibres or introducing a mesh.

The ultrasonic sensor can be arranged at the bale chamber, i.e. the ultrasonic sensor can be arranged outside and/or inside the bale chamber, can preferably be attached, outside and/or inside the bale chamber, to the bale chamber in a fixed or detachable fashion. The ultrasonic sensor can be directed into the bale chamber, i.e. the ultrasonic sensor can be arranged in such a way that an ultrasonic wave which is emitted by the ultrasonic sensor is directed into the bale chamber, in particular in the direction of the surface of the round bale and/or of the first film. Specifically, the ultrasonic sensor can be arranged outside the bale chamber on a side element, for example a side wall, of the round baler, in particular attached in a fixed or detachable fashion. The ultrasonic sensor can, however, also be arranged outside the bale chamber on a further side element, for example a further side wall, of the round baler, in particular attached in a fixed or detachable fashion. The side elements or side walls can be embodied, in particular, as a right-hand and left-hand side wall, and can bound the bale chamber in a forward travel direction laterally and/or at the end side of a cylindrical round bale to be pressed. However, the ultrasonic sensor can also be arranged inside the bale chamber on the side element of the bale chamber, in particular attached in a fixed or detachable fashion. The ultrasonic sensor can, however, also be arranged, in particular attached, between the pressing means or within the pressing means and/or adjoining the round bale and/or between the pressing means and the side element. The ultrasonic sensor can, however, also be arranged and/or attached on the wrapping device and/or the feed device and/or the feed point, in particular the ultrasonic sensor can be arranged and/or attached to the contact pressure element and/or to the guiding element. Specifically, two or more ultrasonic sensors can also be provided, at least some of the ultrasonic sensors of which can be arranged outside and/or at least some of the ultrasonic sensors of which can be arranged inside the bale chamber and/or at least some or all of which can be arranged on the pressing means and/or on the side element. The two or more ultrasonic sensors can be directed into the bale chamber.

The ultrasonic sensor can generate or emit an ultrasonic wave, in particular an ultrasonic pulse and/or receive or detect an ultrasonic wave which is reflected by the surface of the round bale and/or the first film, that is to say an echo of the ultrasonic pulse. The term can be determined or the ultrasonic sensor determines can be understood as meaning, in particular, that the ultrasonic sensor emits an ultrasonic wave in the direction of the surface of the round bale and/or in the direction of the first film on the surface of the round bale and receives or detects no echo and/or the production of an output signal which can signal whether the first film is arranged on the surface of the round bale. The term can be scanned can be understood as meaning, in particular, that the ultrasonic sensor is arranged on the bale chamber in such a way that the surface of the round bale of the first film is accessible to an ultrasonic wave and/or that an echo can be detected with the ultrasonic sensor. The ultrasonic sensor can output digital or analogue output signals here. The ultrasonic sensor can also evaluate the received echo, in particular the amplitude and/or the energy of the echo, and generate the output signal, which represents, in particular, the evaluation of the ultrasonic pulse and/or the echo.

With the round baler according to the disclosure, it is possible to determine whether the first film is present on a surface of the round bale and/or whether the first film is correctly arranged on the surface of the round bale or whether the wrapping process of the round bale is running correctly and the first bale is not wrapped around components of the round baler or backs up undesirably. If the ultrasonic sensor determines that the first film is not present even though the wrapping process has been started, the wrapping process can be broken off, and further backing up and/or blockage does not occur with the first film. Moreover, the ultrasonic sensor can also be used for further measurements, for example transit time measurements for detecting the size of the round bale.

In one refinement of the disclosure, the round baler comprises a bale-wrapping device for wrapping the round bale with a second film, wherein the bale-wrapping device adjoins the bale chamber, in particular at a discharge opening, along a longitudinal axis of the round baler. The bale-wrapping device can therefore be arranged downstream of the bale chamber, preferably in a rear part of the round baler. The bale-wrapping device can receive a round bale from the round baler after the conclusion of a pressing process or after the wrapping process and can wrap the pressed round bale with the second film. The second film can be a plastic film or a film made of plastic and/or a film which comprises plastic or is coated with plastic. The second film can also be a multi-layer composite film made of a combination of different plastics. The mechanical load-bearing capacity may also have been increased by reinforcing with glass fibres or introducing a mesh. The bale-wrapping device can be embodied as an additional assembly which is coupled to the round baler, in particular therefore a press/wrapping device combination, denoted as a combination press, or can be connected as an integrated assembly to the round baler. The round bale can therefore advantageously be wrapped with two films, in particular with two films which are different from one another. As a result of the fact that both wrapping materials are made of plastic, costly separation of the wrapping materials during unpacking can be avoided.

In one refinement of the disclosure, the ultrasonic sensor is arranged perpendicularly with respect to the surface of the round bale and/or with respect to the first film and is configured in such a way that the ultrasonic sensor emits an ultrasonic pulse and receives an echo if the first film is present on the surface of the round bale. The term "perpendicular with respect to the surface" can be understood as meaning that the surface normal and the direction in which the ultrasonic sensor is oriented in order to determine the first film, enclose a detection angle $\alpha$ of $0 \leq \alpha \leq 10$ degrees, preferably of $0 \leq \alpha \leq 5$ degrees, specifically $0 \leq \alpha \leq 2$ degrees. In this first mode for determining the first film the following applies: if a first film is not present on the surface of the round bale and if the ultrasonic sensor is arranged in the region of the detection angle, the ultrasonic wave which is emitted by the ultrasonic sensor or the ultrasonic pulse is partially or completely absorbed by the round bale, and the ultrasonic sensor does not receive an echo. If, on the other hand, the first film is present on the surface of the round bale and if the ultrasonic sensor is arranged in the region of the detection angle, the ultrasonic wave which is emitted by the ultrasonic sensor or the ultrasonic pulse is partially or completely reflected by the round bale, in particular the first film, and the ultrasonic sensor receives an echo. The ultrasonic sensor can therefore generate an output signal if an echo is received, since the first film is then present on the surface. The measure has the advantage that with the ultrasonic sensor it is possible to determine very precisely whether the first film is correctly present or arranged on the surface of the round bale. In contrast to known devices and methods, for example for detecting net or yarn, with the round baler according to the disclosure it is possible to determine the first film on a surface of a round bale in a simple way by means of a device which is technically and/or structurally simple.

In one refinement of the disclosure, the ultrasonic sensor is arranged and configured in such a way that the ultrasonic sensor encloses an orientation angle with the surface normal of the surface of the round bale and/or of the first film and does not receive an echo of the ultrasonic pulse if the first film is present on the surface of the round bale. The term the ultrasonic sensor does not receive an echo of the ultrasonic pulse can be understood as meaning that the echo can be detected only partially and/or has an intensity which is low in comparison with the maximum intensity, for example an intensity within or only slightly above the noise level, or the intensity of the echo cannot be detected at all. The surface normal and the ultrasonic sensor, in particular the direction in which the ultrasonic sensor is oriented, can enclose an orientation angle β of 85≥β≥5 degrees, preferably β of 85≥β≥10 degrees, particularly preferably of 85≥β≥55 degrees, specifically of 85≥β≥75 degrees. In this second mode for determining the first film the following applies: if a first film is not present on the surface of the round bale and if the ultrasonic sensor is arranged in the region of the orientation angle, the ultrasonic wave which is emitted by the ultrasonic sensor or the ultrasonic pulse is partially or completely reflected by the round bale in the direction of the ultrasonic sensor, and the ultrasonic sensor receives an echo. If, on the other hand, the first film is present on the surface of the round bale and if the ultrasonic sensor is arranged in the region of the orientation angle, the ultrasonic wave which is emitted by the ultrasonic sensor or the ultrasonic pulse is reflected away from the ultrasonic sensor, partially or completely by the round bale, in particular by the first film, or scattered and the ultrasonic sensor does not receive an echo. The ultrasonic sensor can therefore produce an output signal if no echo is received, since the first film is then present on the surface. The measure has the advantage that with the ultrasonic sensor it is possible to determine very precisely whether the first film is correctly present or arranged on the surface of the round bale. In contrast to known devices and methods, for example for detecting net or yarn, with the round baler according to the disclosure is it possible to determine the first film on a surface of a round bale in a simple way by means of a device which is technically and/or structurally simple.

In one refinement of the disclosure, the bale chamber comprises a side element in which a sensor opening is formed, and a screening element is arranged on the sensor opening in such a way that no harvested material passes from the bale chamber onto and/or into the sensor opening and/or the sensor opening cannot be blocked by means of harvested material from the bale chamber, and/or no harvested material contaminates the ultrasonic sensor. The bale chamber can also comprises two side elements which are embodied as right-hand and left-hand side walls in which one or more sensor openings can be formed. The screening element therefore makes it possible for the ultrasonic sensor to emit, undisturbed by harvested material, an ultrasonic wave from outside the bale chamber into the bale chamber and/or detect an echo by means of the ultrasonic sensor. The ultrasonic sensor can be oriented, for example, through the sensor opening, for example a hole or a bore hole in the side element or elements in the direction of the surface of the round bale and/or the first film, with the result that an emitted ultrasonic wave can be emitted from outside the bale chamber into the bale chamber and/or an echo can be detected. The screening element can be arranged on the bale chamber, in particular on the side element or the side wall or else on the frame or the like, in particular can be attached in a fixed or detachable fashion. The screening element can be, for example, a piece of sheet metal or a deflection plate. The screening element can be arranged at the sensor opening in such a way that it is advantageously possible to prevent the harvested material passing onto or into the sensor opening and/or blocking it and/or collecting there. Furthermore, it can be advantageous to prevent contamination of the ultrasonic sensor with harvested material.

In one refinement of the disclosure, the ultrasonic sensor is arranged on a securing element, in particular is attached or can be attached in a fixed or detachable fashion, and the securing element is attached or can be attached to the bale chamber in a fixed or detachable fashion, in particular outside or within the bale chamber on the side element or the side wall. The ultrasonic sensor can be arranged, in particular oriented, by means of the securing element in such a way that an ultrasonic wave which is emitted by the ultrasonic sensor or the ultrasonic pulse is directed into the bale chamber onto the round bale and/or the first film and/or an echo can be received. The securing element can be an L-shaped component and/or a single-piece or two-piece or multi-piece component. The ultrasonic sensor can be arranged spaced apart from the bale chamber, preferably from the side element, particularly preferably with respect to the sensor opening, in particular can be arranged at a predefined distance, by means of the securing element. The ultrasonic sensor can advantageously therefore be spaced apart and/or dismantled and/or replaced in a simple way by means of the securing element. Moreover, by virtue of the fact that the ultrasonic sensor is arranged at a distance from the side element and/or the sensor opening by means of the securing element, the ultrasonic sensor can be advantageously prevented from being contaminated and/or blocked by the harvested material from the bale chamber.

In one refinement of the disclosure, the ultrasonic sensor is arranged downstream of the feed point and/or upstream of the feed point. If the ultrasonic sensor is provided downstream of the feed point, it can already be detected shortly after the start of the wrapping phase whether the wrapping process is running correctly and the round bale is enclosed by the first film. The term downstream of the feed point is understood as meaning that the ultrasonic sensor is arranged after the point at which the first film reaches the round bale. The ultrasonic sensor can, however, also be provided upstream of the feed point, wherein the term "upstream" is to be understood as meaning that the ultrasonic sensor is arranged ahead of the feed point with respect to the rotational direction of the round bale. If the ultrasonic sensor is provided here, it can thus determine whether a first layer of the first film has been placed around the round bale. If this is the case, there is only a slight risk of incorrect guidance or tangling etc. of the first film occurring during a further wrapping process.

In one refinement of the disclosure, two or more ultrasonic sensors are provided. Two to six ultrasonic sensors, specifically two or three or four or five or six ultrasonic sensors, can preferably be arranged on or in the bale chamber and/or directed into the bale chamber. The ultrasonic sensors can also be arranged and/or attached on the round baler, in particular on the wrapping device and/or the feed device and/or the feed point, in particular the ultrasonic sensors can be arranged and/or attached on the pressure contact element and/or on the guiding element. The ultrasonic sensors can be arranged next to one another or adjacently and/or in a row. Likewise, ultrasonic sensors can extend along the width of the bale chamber and/or can be aligned with the circumferential face of the round bale and/or aligned with the base face of the round bale. If two or more ultrasonic sensors are present it is also possible for the first and the second mode to be used in combination, with the result that it can be detected more precisely and better whether the first film has been correctly applied to the round bale. If two or more ultrasonic sensors are present, it can advantageously be determined simultaneously at a plurality of locations on the round bale whether the first film is correctly arranged on the surface of the round bale. Furthermore, the round baler has little susceptibility with respect to the failure of one of the ultrasonic sensors, since the remaining ultrasonic sensors are sufficient to detect whether the first film is correctly arranged on the surface of the round bale. Specifically, a first ultrasonic sensor can be arranged downstream, and a second ultrasonic sensor upstream, of the feed point. If an ultrasonic sensor is provided both downstream and upstream of the wrapping web feed point, the above-mentioned advantages can be combined and it can be detected both whether the wrapping process has started correctly and whether the first film has been applied to the round bale.

In one refinement of the disclosure, feeding of the first film and/or rotation of the round bale can be adjusted as a function of an output signal of the ultrasonic sensor. Furthermore, the round baler comprises a control unit, and the ultrasonic sensor has a signal connection to the control unit. The terms can be adjusted or adjust can be understood here as meaning open-loop control and/or closed-loop control and/or the adjustment of a component of the round baler by means of the actuating device and/or the actuator. The ultrasonic sensor can thus interact with the preferably electric or electronic control unit (ECU=electronic control unit or ECM=electric control module) which can be an electronic module and/or an embedded system, in particular can be adjusted with the control unit. Control units can already be provided on round balers or on vehicles by which round balers are towed, for example in order to adjust the round baler and/or set further functions of the round baler. Specifically, the control unit is also configured in such a way that the detection method described below can be executed with the round baler. The ultrasonic sensor can therefore send the output signal to the control unit and/or receive a setpoint value from the control unit and/or can be adjusted by means of the control unit. The output signal of the ultrasonic sensor can also be received and/or processed by means of the control unit, in particular the wrapping process can be automatically broken off by means of the control unit in the event of a malfunction. In this context, the output signal can be an actual value which has been detected by the ultrasonic sensor, and can be compared with a setpoint value by means of the control unit. Likewise, the setpoint value at the ultrasonic sensor can be adjusted by means of the control unit and can be compared with the setpoint value by means of the ultrasonic sensor. The control unit can additionally also have a signal connection to the one or more actuating devices and/or actuators of the round baler, with the result that the actuating device and/or the actuator can be adjusted with the control unit, and these can be adjusted, in particular, by means of a control signal which the control unit transmits to the actuating device and/or the actuator. The control unit and/or the ultrasonic sensor and/or the actuating device and/or the actuator can be connected to one another by means of a cable or wire or else in a wireless fashion, that is to say by means of a radio, wherein the communication bus can be an Isobus, CAN bus or the like. The control unit also permits a chronological component to be included, for example in such a way that the output signal is determined after a predefined time interval after the start of the wrapping process. The time interval is be selected here in such a way that given satisfactory functioning it can be expected that the film is applied to the round bale at the point under consideration. In this context, the rotational speed of the round bale can also be taken into account.

In accordance to the output signal which is supplied by the ultrasonic sensor, the control unit can adjust the round baler, in particular the actuating device and/or the actuator, in such a way that rotation of the round bale and/or feeding of the first film to the round bale are/is adjusted. Specifically, in the event of it being determined that the wrapping process is not being carried out satisfactorily, the rotation of the round bale and/or the feeding of the first film to the round bale is stopped and/or no further first film is pulled off from the supply. The actuating device and/or the actuator can be provided at the round baler, in particular at the wrapping device and/or the feed device. The output signal can, for example, also activate an indication or an optical and/or acoustic warning display which indicates to an operator that there is a malfunction of the wrapping function, with the result that the operator can interrupt the wrapping phase. Therefore, faulty wrapping of the round bale can be detected in good time and interrupted. The operator control of the round baler is as a result simplified and the interruption time as a result of faulty wrapping is shortened.

In one refinement of the disclosure, the surface is at least one circumferential surface of the round bale. The ultrasonic sensor can therefore be directed onto the circumferential surface of the round bale. However, an ultrasonic sensor can be also be provided which determines whether the side faces of the round bale are also covered with the first film. Furthermore, an ultrasonic sensor can be provided which is directed onto an edge region of the round bale and determines, for example, whether the first film is positioned over a corresponding edge of the round bale.

In one refinement of the disclosure, the first and second film can be different from one another, in particular the first film can have a lower modulus of elasticity than the second film. Therefore, the first film, which holds together the round bale, is more stable than the second film which protects the round bale against environmental influences.

The disclosure also relates to a detection method for detecting a first film, in particular also the second film, on a surface of a round bale. The detection method comprises a round baler with a bale chamber in which a round bale is produced, and a wrapping device with which a completely pressed round bale is wrapped in the bale chamber with the first film, and a feed device with which the first film is introduced into the bale chamber at a feed point. The round baler also includes an ultrasonic sensor which is arranged at the bale chamber in such a way that with the ultrasonic sensor it is determined whether the first film is present on the surface of the round bale. The detection method can be carried out, in particular with a round baler as described herein. The detection method according to the disclosure has the advantages described above of the round baler.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 shows a second exemplary embodiment of the round baler according to the disclosure.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
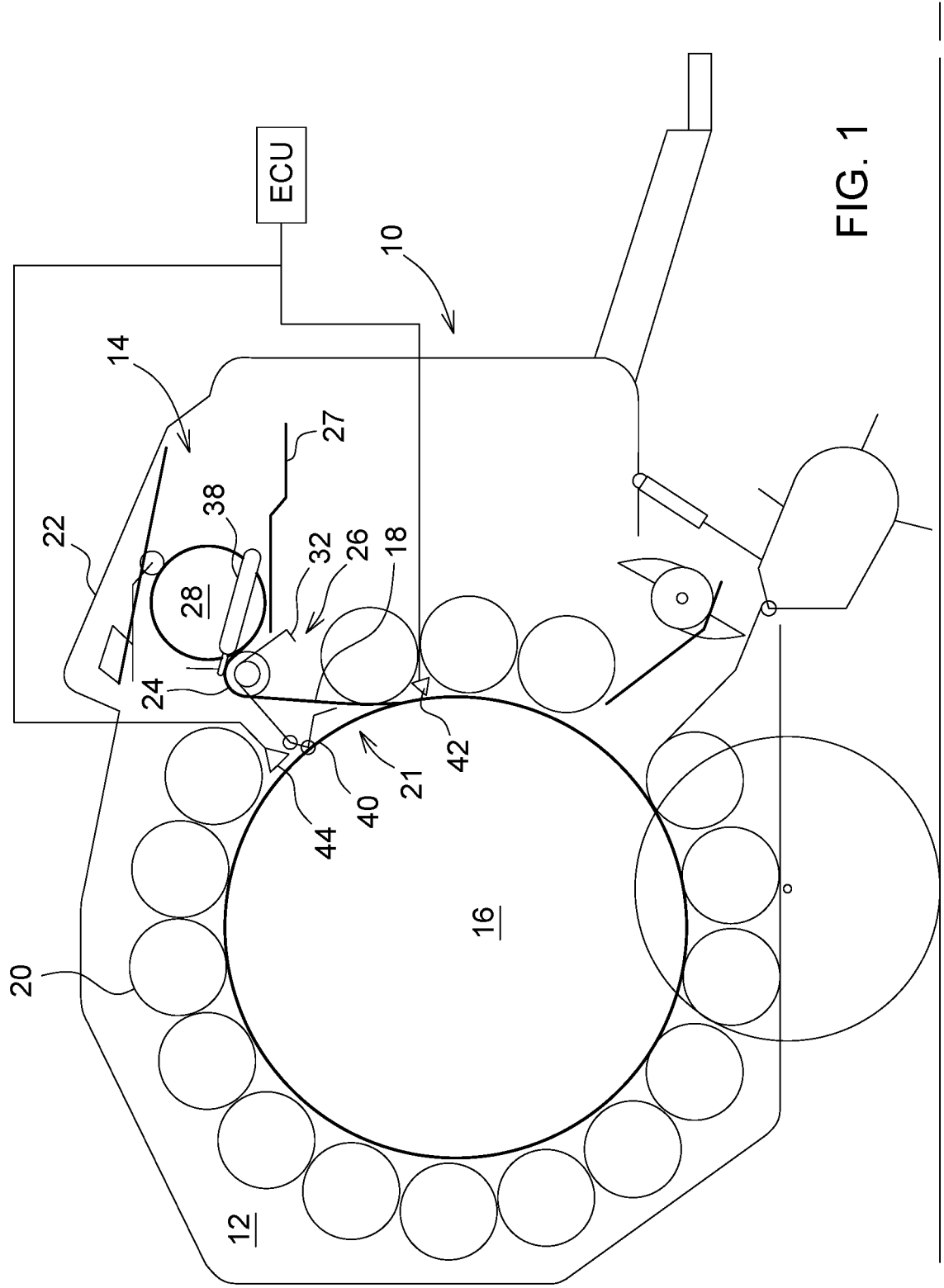
FIG. 1 shows a first exemplary embodiment of a round baler according to the disclosure.

Referring to the Figures, wherein like numerals indicate like parts throughout the several views, FIG. 1 shows a schematic illustration of a first exemplary embodiment of the round baler 10 according to the disclosure, having a bale chamber 12 in which a round bale 16 can be produced, and a wrapping device 14 with which the round bale 16, which is formed in the bale chamber 12, can be wrapped with a first film 18. The round baler 10 can be of a known design, i.e. with a bale chamber 12 which has a constant or variable size and which is surrounded exclusively or in combination by pressing means, for example belts, chains, or by pressing rollers or pressing drums 20 as in the exemplary embodiment. Such a round baler 10 can be used in agriculture for forming round bales 16 made of harvested material such as e.g. straw, hay or grass. Use in industrial fields is also conceivable.

The wrapping device 14 is provided in the present exemplary embodiment on the front side of the round baler 10, however it can also be arranged in a central region of the round baler 10 or also in front of or above the bale chamber 12. The round baler 10, in particular the wrapping device 14, has a feed device 24 for introducing the first film 18 into the bale chamber 12, and a feed point 21 at which the first film 18 can be fed to the bale chamber 12. The first film 18 is fed through a gap between two adjacent pressing drums 20, that is to say the feed point 21, the bale chamber 12, where it is carried along by the round bale 16 which is set in rotation. The round bale 16 is bound by means of the first film 18 and therefore prevented from falling apart after it leaves the round baler 10. The wrapping device 14 also comprises a housing 22 and an advancing element which is embodied, for example, as an advancing roller, and a separating device 26. The housing 22 contains a compartment floor 27 on which the first film 18 is mounted as a supply roller 28. The compartment floor 27 can also be embodied in such a way that it supplies a plurality of supply rollers 28 and/or has steps or troughs for securing the position thereof.

The advancing element and/or the feed device 24 are provided on their circumferential face with a lining with a high coefficient of friction and can be set in rotation. The rotation initially helps to pull off the first film 18 from the supply roller 28, and develop a tension therein during the wrapping process owing to a braked rotational movement. The supply roller 28 is located above the support plane of the compartment floor 27, and in its operating position comes to bear, with a region which corresponds approximately to a 6 to 9 o'clock position, on the feed device 24. The first film 18 is pulled off the supply roller 28 by the feed device 24 and is guided into the bale chamber 12 through the feed point 21, between the adjacent pressing rollers 20. In the case of correct operation, the first film 18 is taken up by the round bale 16 and wraps it.

The separating device 26 has a knife 32 which is pivotably attached in order to enter the path of the first film 18 and cut through it or bring about tearing off when the wrapping process is concluded. Pivoting of the knife 32 is carried out by means of an actuating device, a hydraulic motor 38, which is activated by means of a control unit ECU. Moreover, in the present exemplary embodiment a guide device or guide element 40, which makes the first film 18 approach the roller 16, is provided in a pivotable fashion.

Moreover, an ultrasonic sensor 44 in the region between the pressing rollers 20 is provided adjacent to the round bale 16 in the bale chamber 12. The ultrasonic sensor 44 is arranged upstream of the wrapping web feed point 21 or in a region lying behind the wrapping web feed. The ultrasonic sensor 44 determines whether the round bale 16 is wrapped with the first film 18 at the respective point or whether the round bale 16 has not been wrapped with the first film 18 owing, for example, to a malfunction or a lack of first film 18 on the supply roller 28.

The round baler 10 comprises the control unit ECU and the ultrasonic sensor 44 has a signal connection to the control unit ECU. The ultrasonic sensor 44 can transmit an output signal to the control unit ECU which can be processed by said control unit, with the result that with the control unit ECU it is possible to perform open-loop and/or closed-loop control of the process of wrapping the round bale 16 with the first film 18. Moreover, a further or second ultrasonic sensor 42 is also provided in the bale chamber, which ultrasonic sensor 42 can be provided downstream of the location of the feed point 21, for example in the region of the supply of material. The second ultrasonic sensor 42 can also have a signal connection to the control unit ECU.

In the text which follows, more details will be given on the method of functioning of the round baler. If the formation of the round bale 16 in the bale chamber 12 is concluded, which is determined in a manner known per se by means of a sensor (not illustrated) which determines the thickness of the round bale 16, for example mechanically or optically, the wrapping device 14 is actuated. This is done by the hydraulic motor 38 being actuated by the open-loop and/or closed-loop control device ECU and moved into its retracted position (illustrated in the figure). In this position, the feed device 24 is set in rotation. The feed device 24 then pulls the first film 18 off the supply roller 28. The first film 18 moves between the pressing rollers 20 and up to the round bale 16, where it is supported in this process by the guide device 40. In the case of correct functioning of the wrapping device 14, the first film 18 is taken up by the round bale 16 and carried along, as a result of which the round bale 16 is automatically wrapped, by virtue of its rotation, with the first film 18.

With the ultrasonic sensor 44 it is possible to determine whether the round bale 16 has been completely wrapped with a first layer of the first film 18. If this is the case, the wrapping process is continued. The end of the process is then determined in a customary fashion, for example after a predefined time period or by determining a predefined length of the first film 18. In this context there can be provision that the length of the first film 18 is also determined by the ultrasonic sensor 44 as has been described above, or else that a further sensor etc. is provided which records, for example, the number of revolutions of the round bale or of the supply. If it is detected by the ultrasonic sensor 44 that a first film 18 is not present on the round bale 16, a corresponding output signal is transmitted to the control unit ECU. The latter can then break off the wrapping process and, for example, prevent the round bale 16 from rotating any longer or can prevent a further first film 18 from being pulled off the supply roller 28 by the feed device 24. The second ultrasonic sensor 42 is arranged upstream of the feed point 21 and can determine whether the first film 18 is present on the round bale 16 and whether the wrapping process is running correctly. If it is detected by the second ultrasonic sensor 42 that there is no first film 18 present on the round bale 16, the second ultrasonic sensor 42 thus also supplies a corresponding output signal to the control unit ECU, which proceeds according to an output signal of the ultrasonic sensor 44. After the wrapping process has been correctly concluded, the first film 18 is cut by the separating device 26 and the wrapped round bale 16 can be ejected from the bale chamber 12 of the round baler 10 in a customary fashion.

FIG. 2 shows a schematic illustration of a second exemplary embodiment of a round baler 10 according to the disclosure. The round baler 10 which is shown in FIG. 2 corresponds essentially to the round baler 10 which is shown in FIG. 1, with the result that in the text which follows only the differences are discussed. The bale-wrapping device 54 for wrapping the round bale 16 with a second film 58 has a frame 52, a wrapping table or a holding device 54 for holding the round bale 16 which is to be wrapped, as well as wrapping arms 56 which can be made to move about an axis A in order to wrap the round bale 16 with a second film 58, for example a film made of plastic, by means of a suitable drive (not shown). The bale-wrapping device 54 adjoins a discharge opening at the bale chamber 12 along a longitudinal axis L of the round baler 10, and is arranged downstream of the bale chamber 12, preferably in a rear region.

Figure 3A:
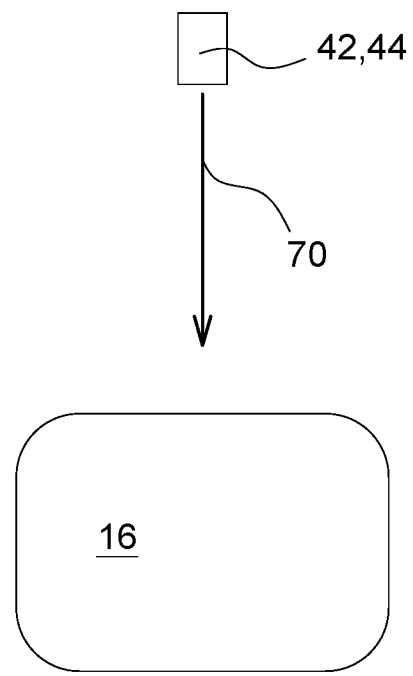
FIG. 3A shows a schematic illustration of an ultrasonic sensor which is arranged perpendicularly with respect to the surface of a round bale without a first film.

FIG. 3A shows a schematic illustration of the ultrasonic sensor 42, 44 which is arranged perpendicularly with respect to the surface of a round bale. The round baler 10 which is shown in FIGS. 1 and 2 can comprise the ultrasonic sensor 42, 44 which is shown in FIG. 3A, with the result that in the text which follows reference is made only to the differences. The surface of the round bale 16 (shown in FIG. 3A) is not covered with the first film 18. The ultrasonic sensor 42, 44 is arranged perpendicularly, particularly in the region of the detection angle, and is configured in such a way that the ultrasonic sensor 42, 44 outputs an ultrasonic pulse 70 and receives an echo 72 of the ultrasonic pulse 70 if the first film 18 is present on the surface of the round bale 16. The surface normal and the ultrasonic sensor 42, 44, in particular the direction in which the ultrasonic sensor 42, 44 is oriented in order to determine the first film 18, enclose the detection angle of 0 degrees. The ultrasonic wave which is emitted by the ultrasonic sensor 42, 44 or the ultrasonic pulse 70 is partially or completely absorbed by the round bale 16, in such a way that the ultrasonic sensor 42, 44 does not receive or detect an echo.

Figure 3B:
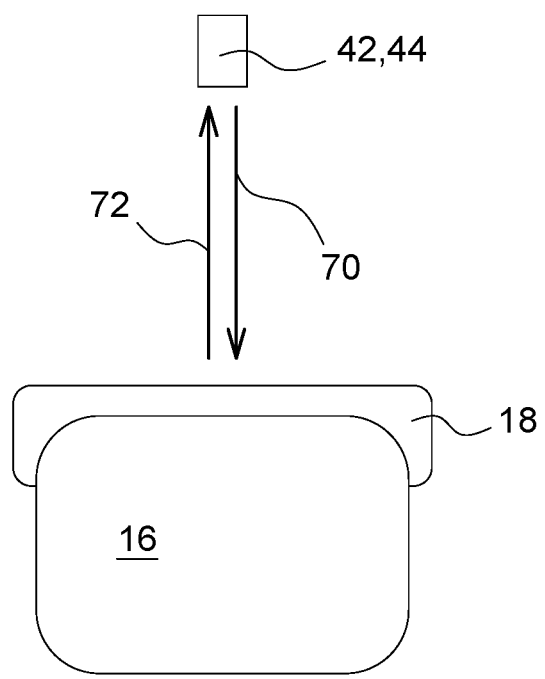
FIG. 3B shows a schematic illustration of the ultrasonic sensor which is arranged perpendicularly with respect to the surface of the round bale with a first film.

FIG. 3B shows a schematic illustration of the ultrasonic sensor 42, 44 which is arranged perpendicularly with respect to the surface of a round bale. The round baler 10 which is shown in FIGS. 1 and 2 can comprise the ultrasonic sensor 42, 44 which is shown in FIG. 3B and which also corresponds to the ultrasonic sensor shown in FIG. 3A, with the result that in the text which follows only the differences are discussed. The surface of the round bale 16 which is shown in FIG. 3B is covered with the first film 18. The ultrasonic sensor wave which is emitted by the ultrasonic sensor 42, 44 or the ultrasonic pulse 70 is partially or completely reflected by the first film 18 on the surface of the round bale 16. Therefore, the ultrasonic sensor 42, 44 receives or detects an echo 72, that is to say a reflected or ultrasonic wave 72.

Figure 4A:
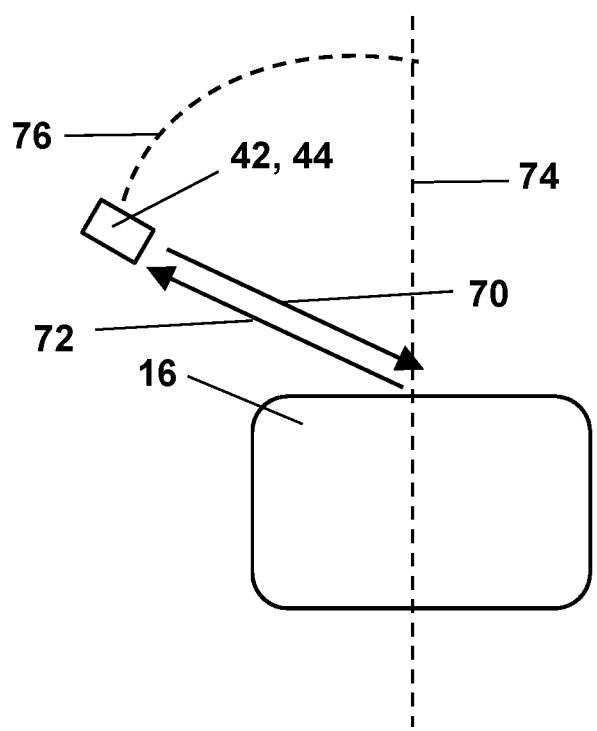
FIG. 4A shows a schematic illustration of the ultrasonic sensor which encloses an orientation angle with the surface normal of the surface of the round bale, wherein a first film is not arranged on the surface of the round bale.

FIG. 4A shows a schematic illustration of the ultrasonic sensor 42, 44 which is arranged and configured in such a way that the ultrasonic sensor 42, 44 encloses an orientation angle β (reference symbol 76) with the surface normal 74 of the surface of the round bale 16 and does not receive an echo 72 of the ultrasonic pulse 70 if the first film 18 is present on the surface of the round bale 16. The round baler 10 (shown in FIGS. 1 and 2) can comprise the ultrasonic sensor 42, 44 which is shown in FIG. 4A with the result that in the text which follows only the differences are discussed. The surface of the round bale 16 which is shown in FIG. 4A is not covered with the first film 18. The surface normal 74 and the ultrasonic sensor 42, 44, in particular the direction in which the ultrasonic sensor 42, 44 is oriented in order to determine the first film 18, enclose the orientation angle 76, in FIG. 4A an orientation angle of approximately 60 degrees. The ultrasonic wave 70 which is emitted by the ultrasonic sensor 42, 44 of the ultrasonic pulse 70 is partially or completely scattered and/or reflected by the round bale 16, in particular in the direction of the ultrasonic sensor 42, 44, specifically in such a way that the ultrasonic sensor 42, 44 receives or detects an echo 72.

Figure 4B:
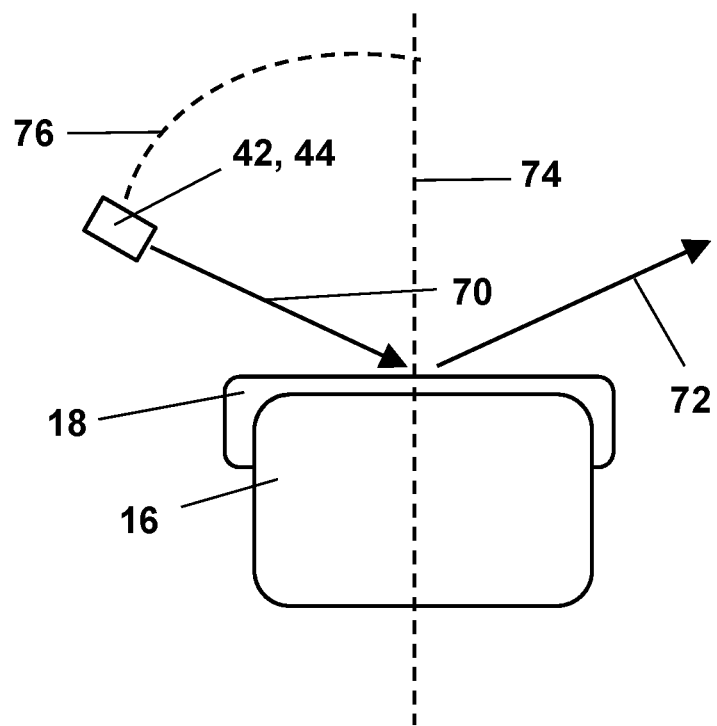
FIG. 4B shows a schematic illustration of the ultrasonic sensor which encloses an orientation angle with the surface normal of the surface of the round bale, wherein a first film is arranged on the round bale.

FIG. 4B shows a schematic illustration of the ultrasonic sensor 42, 44 which is arranged and configured in such a way that the ultrasonic sensor 42, 44 encloses an orientation angle 76 with the surface normal 74 of the surface of the round bale 16. The round baler 10 which is shown in FIGS. 1 and 2 can comprise the ultrasonic sensor 42, 44 which is shown in FIG. 4B and which corresponds to the ultrasonic sensor shown in FIG. 4A, with the result that in the text which follows reference is made only to the differences. The surface of the round bale 16 which is shown in FIG. 4B is covered with the first film 18. The surface normal and the ultrasonic sensor 42, 44, in particular the direction in which the ultrasonic sensor 42, 44 is oriented in order to determine the first film 18, enclose the orientation angle 76 according to FIG. 4A. The ultrasonic wave 70 which is emitted by the ultrasonic sensor 42, 44 or the ultrasonic pulse 70 is partially or completely reflected by the first film 18 on the surface of the round bale 16, in particular reflected or scattered away from the ultrasonic sensor 42, 44. Therefore, the ultrasonic sensor 42, 44 does not receive or detect an echo 72, that is to say no ultrasonic wave 72 reflected by the first film 18.

Figure 5:
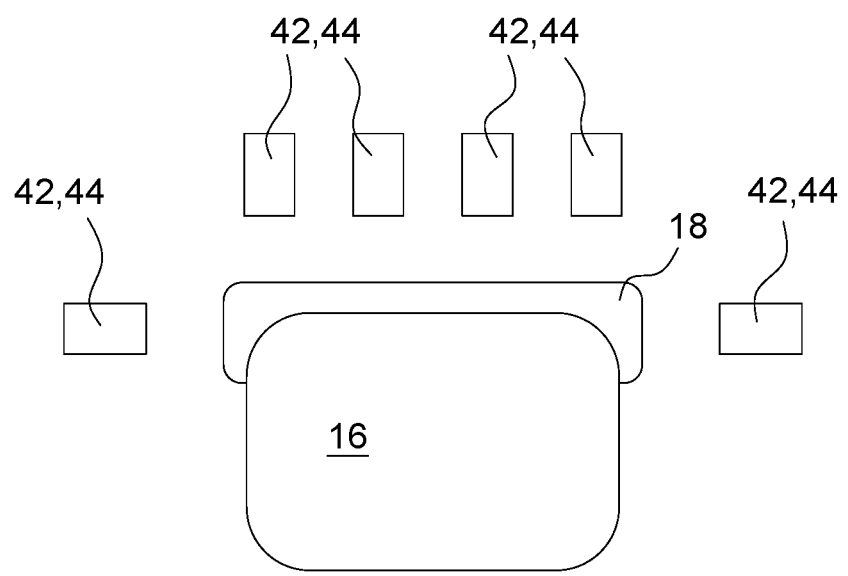
FIG. 5 shows a schematic illustration of the arrangement possibilities of the ultrasonic sensor or sensors on the round baler according to the disclosure.

FIG. 5 shows a schematic illustration of the arrangement possibilities of the ultrasonic sensor or sensors 42, 44 at the round baler 10 according to the disclosure. The round baler 10 which is shown in FIGS. 1 and 2 can comprise the arrangement possibilities (shown in FIG. 5) of the ultrasonic sensors 42, 44. Furthermore, the ultrasonic sensors 42, 44 can have the modes shown in FIGS. 3A, 3B, 4A, and 4B. For this reason, in the text which follows reference is made only to the differences from the previous figures. FIG. 5 shows six ultrasonic sensor 42, 44 which are arranged on or around a round bale 16, on whose surface a first film 18 is arranged. The ultrasonic sensors 42, 44 are arranged and oriented in such a way that they can transmit an ultrasonic wave 70 onto the round bale 16 or onto a first film 18 which is arranged on the surface of the round bale 16 and/or can receive a reflected ultrasonic wave, the echo 72. Four of the ultrasonic sensors 42, 44 are arranged one next to the other in a row along the width of the bale chamber 12 and oriented perpendicularly with respect to the surface. Two of the ultrasonic sensors 42, 44 are directed onto a side face of the round bale 16, in order to determine whether the side faces of the round bale 16 are also covered with the first film 18. The arrangement of the ultrasonic sensors 42, 44 which is shown in FIG. 5 can, however, also have only five or four or three or two ultrasonic sensors 42, 44 or just one ultrasonic sensor 42, 44.

Figure 6:
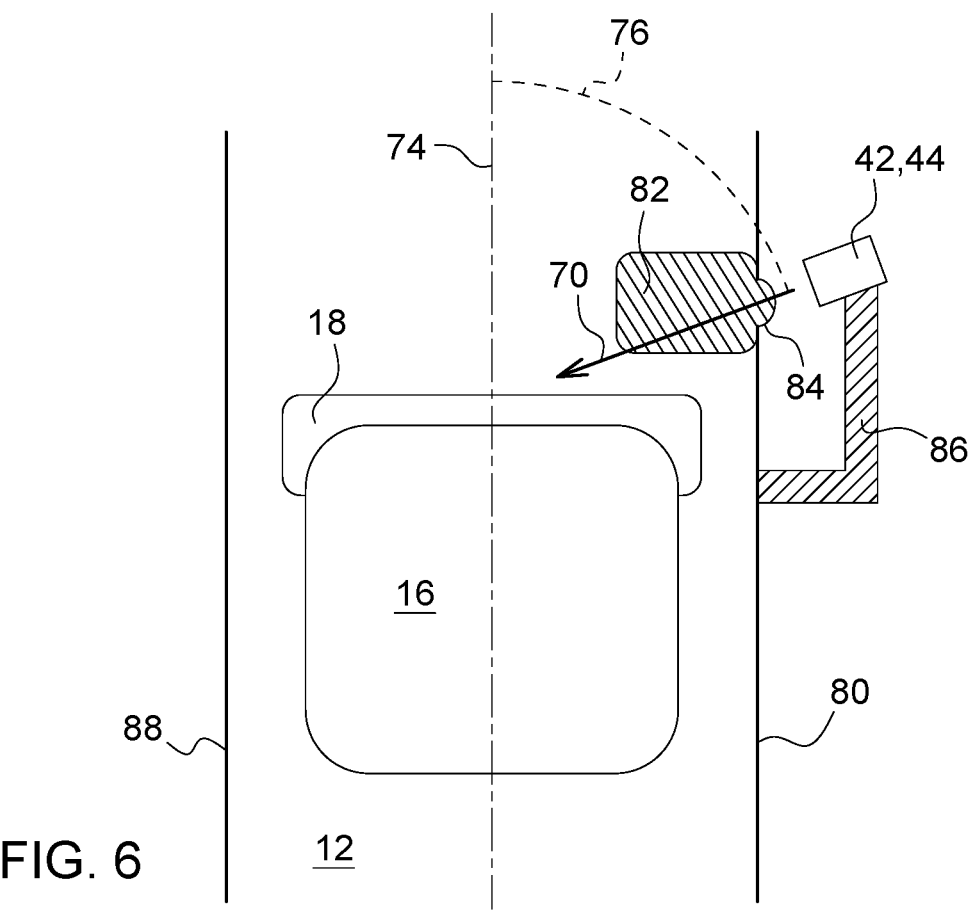
FIG. 6 shows a schematic illustration of a third exemplary embodiment of the round baler according to the disclosure.

FIG. 6 shows a partial schematic illustration of a third exemplary embodiment of the round baler 10 according to the disclosure. The round baler 10 shown in FIG. 6 corresponds essentially to the round baler 10 shown in FIGS. 1, 2 and 5 and can comprise the ultrasonic sensor 42, 44 shown in FIGS. 3a to 5 as well as the arrangement or arrangement possibilities thereof, with the result that in the text which follows reference is made only to the differences. The ultrasonic sensor 42, 44 is arranged by means of a holding element 86 outside the bale chamber 12 on a side element of the bale chamber 12, here embodied as a side wall 80, for example of the right-hand side wall. The ultrasonic sensor 42, 44 can, however, also be arranged on a further side wall 88, for example the left-hand side wall, of the bale chamber 12. The ultrasonic sensor 42, 44 is arranged in such a way that the ultrasonic sensor 42, 44 encloses an orientation angle 76 with the surface normal 74 of the surface of the round bale 16. The side wall 80 also has a sensor opening 84. The sensor opening 84 can be embodied, for example, as a hole or a through borehole. The ultrasonic sensor 42, 44 is arranged, in particular oriented, in such a way that an ultrasonic wave 70 which is emitted by the ultrasonic sensor 42, 44 or the ultrasonic pulse 70 is directed into the bale chamber 12, i.e. propagates from the ultrasonic sensor 42, 44 through the sensor opening 84 to the round bale 16 and/or to the first film 18. Moreover, the round baler 10 comprises a screening element 82 which can be, for example, a screen plate 82 by means of which the harvested material located in the bale chamber 12 is prevented from collecting in the sensor opening 84 and blocking it, and the ultrasonic sensor is prevented from being contaminated.

Figure 7:
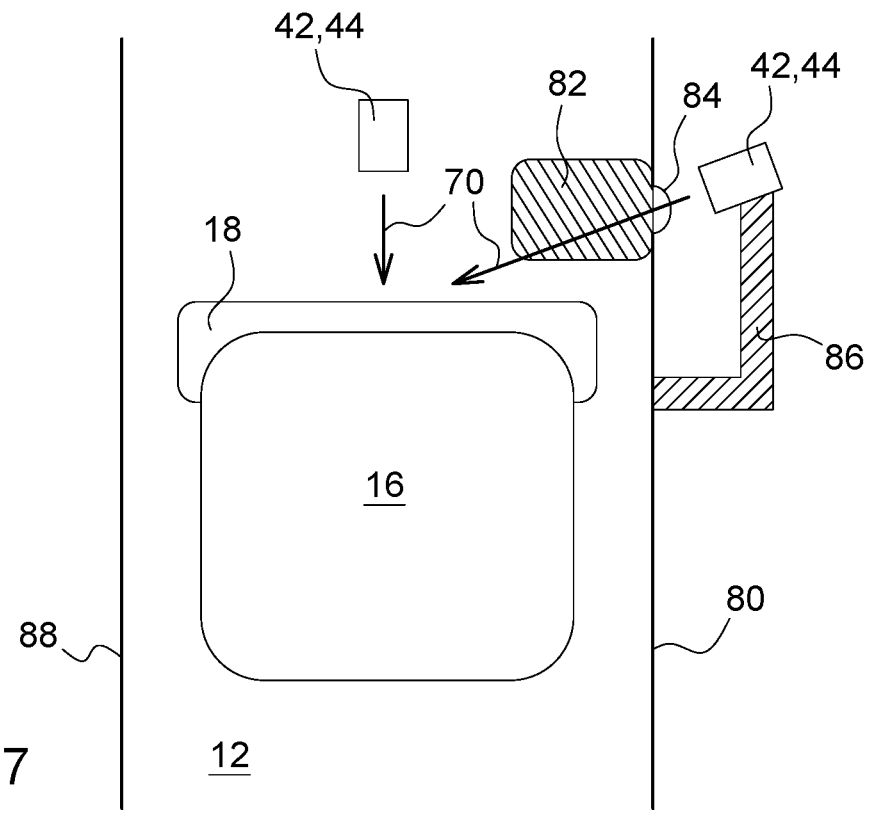
FIG. 7 shows a schematic illustration of a fourth exemplary embodiment of the round baler according to the disclosure.

FIG. 7 shows a partial schematic illustration of a fourth exemplary embodiment of the round baler 10 according to the disclosure. The round baler 10 shown in FIG. 7 corresponds essentially to the round baler 10 shown in FIGS. 1 to 2, 5 and 6 and can comprise the ultrasonic sensor 42, 44 shown in FIGS. 3A to 5 as well as the arrangement or arrangement possibilities thereof, with the result that in the text which follows only the differences are discussed. FIG. 7 shows the ultrasonic sensor 44 arranged outside the bale chamber 12, and the second ultrasonic sensor 42 which is arranged within the bale chamber 12.

Figure 8:
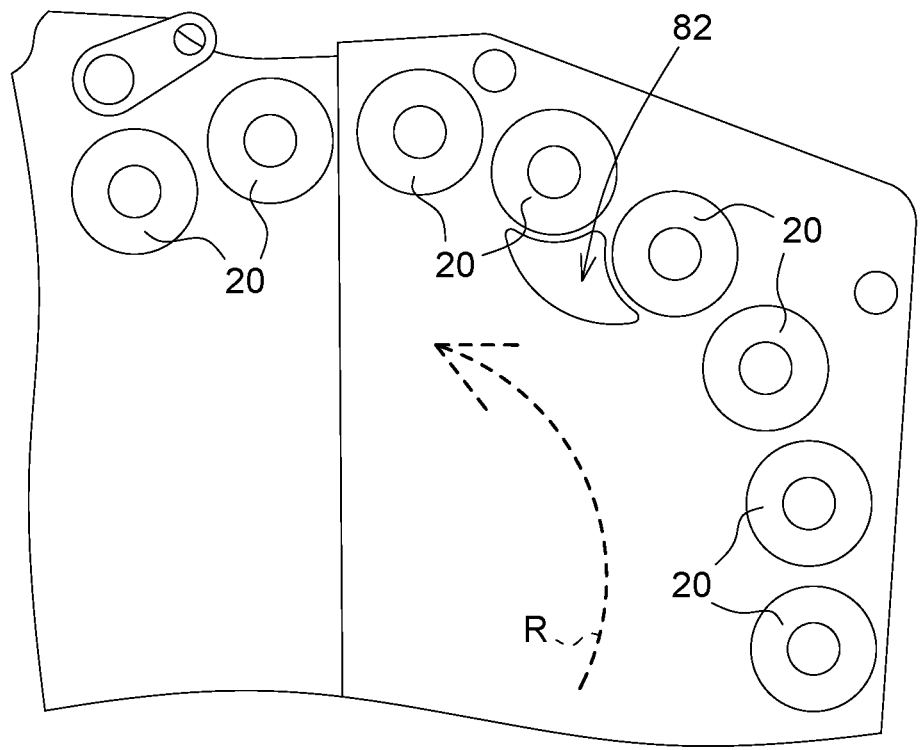
FIG. 8 shows a schematic illustration of a fifth exemplary embodiment of the round baler according to the disclosure.

FIG. 8 shows a partial schematic illustration of a fifth exemplary embodiment of the round baler 10 according to the disclosure. The round baler 10 shown in FIG. 8 corresponds essentially to the round baler 10 shown in FIGS. 1 to 2 and 5 to 7 and can comprise the ultrasonic sensor 42, 44 shown in FIGS. 3A to 5, and the arrangement or arrangement possibilities thereof, with the result that in the text which follows details are given only the differences are discussed. FIG. 8 shows how the screening element 82 can be arranged in the bale chamber 12 between the pressing elements, here the rollers 20. Moreover, the direction of the bale rotation R is indicated.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A round baler comprising:
   a bale chamber in which a round bale can be produced;
   a wrapping device with which a completely pressed round bale can be wrapped with a first film in the bale chamber;
   a feed device for introducing the first film into the bale chamber;
   a feed point at which the first film can be fed to the bale chamber,
   an ultrasonic sensor positioned to emit an ultrasonic pulse toward the round bale, and arranged at the bale chamber to determine a presence of the first film on a surface of the round bale;
   wherein the bale chamber includes a side element in which a sensor opening is formed, and a screening element is arranged on the sensor opening in such a way that no harvested material passes from the bale chamber onto and/or into the sensor opening; and
   wherein the ultrasonic sensor is arranged and configured in such a way that the ultrasonic sensor encloses an orientation angle with the surface normal of the surface of the round bale and does not receive an echo of the ultrasonic pulse if the first film is present on the surface of the round bale.

2. The round baler according to claim 1, further comprising a bale-wrapping device for wrapping the round bale with a second film, wherein the bale-wrapping device adjoins the bale chamber along a longitudinal axis of the round baler.

3. The round baler according to claim 2, wherein the first film has a lower modulus of elasticity than the second film.

4. The round baler according to claim 1, wherein the ultrasonic sensor is arranged on a securing element, and the securing element is attached to the bale chamber.

5. The round baler according to claim 1, wherein the ultrasonic sensor is arranged downstream of the feed point or upstream of the feed point.

6. The round baler according to claim 1, wherein the ultrasonic sensor includes two or more ultrasonic sensors.

7. The round baler according to claim 1, wherein feeding of the first film and/or rotation of the round bale can be adjusted as a function of an output signal of the ultrasonic sensor.

8. The round baler according to claim 1, further comprising a control unit, and the ultrasonic sensor has a signal connection to the control unit.

9. The round baler according to claim 1, wherein the orientation angle is between ten degrees and eighty five degrees relative to normal of the surface of the round bale.

10. A round baler comprising:
a bale chamber in which a round bale can be produced;
a wrapping device with which a completely pressed round bale can be wrapped with a first film in the bale chamber;
a feed device for introducing the first film into the bale chamber;
a feed point at which the first film can be fed to the bale chamber;
an ultrasonic sensor positioned to emit an ultrasonic pulse toward the round bale, and arranged at the bale chamber to determine a presence of the first film on a surface of the round bale;
wherein the ultrasonic sensor is arranged and configured in such a way that the ultrasonic sensor encloses an orientation angle with the surface normal of the surface of the round bale and does not receive an echo of the ultrasonic pulse if the first film is present on the surface of the round bale;
wherein the bale chamber includes a side element in which a sensor opening is formed through which the ultrasonic sensor is positioned to emit the ultrasonic pulse, and a screening element is arranged on the sensor opening in such a way that no harvested material passes from the bale chamber onto and/or into the sensor opening; and
a bale-wrapping device for wrapping the round bale with a second film, wherein the bale-wrapping device adjoins the bale chamber along a longitudinal axis of the round baler.

11. A round baler comprising:
a bale chamber operable to form a round bale;
a wrapping device operable to wrap the round bale with a first film in the bale chamber;
an ultrasonic sensor positioned to emit an ultrasonic pulse toward the round bale at an orientation angle of between ten degrees and eighty five degrees relative to normal of a circumferential surface of the round bale such that the ultrasonic sensor does not receive an echo of the ultrasonic pulse when the first film is present on the circumferential surface of the round bale; and
wherein the bale chamber includes a side element in which a sensor opening is formed, and a screening element is arranged on the sensor opening in such a way that no harvested material passes from the bale chamber onto and/or into the sensor opening.

12. The round baler according to claim 11, further comprising a holding element attached to the ultrasonic sensor and configured to position the ultrasonic sensor adjacent the sensor opening in the side element and outside of the bale chamber.

* * * * *